United States Patent [19]

Nemzek et al.

[11] Patent Number: 6,069,213
[45] Date of Patent: May 30, 2000

[54] MIXED CATALYST SYSTEM

[75] Inventors: Thomas Lloyd Nemzek, Katy, Tex.; Frederick John Karol; Sun-Chueh Kao, both of Belle Mead, N.J.; Robert Converse Brady, III, Houston, Tex.

[73] Assignee: Union Carbide Chemicals & Plastics Technology Corporation, Danbury, Conn.

[21] Appl. No.: 08/991,688

[22] Filed: Dec. 16, 1997

[51] Int. Cl.[7] .................................. C08F 4/06; C08F 4/72; C08F 4/02

[52] U.S. Cl. .................. 526/113; 526/114; 526/118; 526/119; 526/160; 526/161; 526/172; 526/943; 526/351; 502/113; 502/117; 502/118; 502/152

[58] Field of Search ...................... 502/117, 118, 502/152, 113; 526/113, 114, 118, 119, 160, 161, 172, 943

[56] References Cited

U.S. PATENT DOCUMENTS

| | | | |
|---|---|---|---|
| 5,124,418 | 6/1992 | Welborn | 526/114 |
| 5,359,015 | 10/1994 | Jejelowo | 526/114 |
| 5,439,994 | 8/1995 | Inoue et al. | 526/114 |
| 5,470,811 | 11/1995 | Jejelowo et al. | 502/117 |
| 5,516,737 | 5/1996 | Jejelowo | 502/104 |
| 5,516,848 | 5/1996 | Canich et al. | 525/240 |
| 5,527,752 | 6/1996 | Reichle et al. | 502/117 |
| 5,534,473 | 7/1996 | Welch et al. | 502/117 |
| 5,539,066 | 7/1996 | Winter et al. | 526/119 |
| 5,614,456 | 3/1997 | Mink et al. | 502/115 |
| 5,648,428 | 7/1997 | Reddy et al. | 526/116 |

FOREIGN PATENT DOCUMENTS

| | | |
|---|---|---|
| 0452920A2 | 10/1991 | European Pat. Off. . |
| 0705851A2 | 4/1996 | European Pat. Off. . |
| 0768319A1 | 4/1997 | European Pat. Off. . |

*Primary Examiner*—David W. Wu
*Assistant Examiner*—Roberto Rabago
*Attorney, Agent, or Firm*—P. A. Doody

[57] ABSTRACT

It has been found that the use of at least one unsupported metallocene polymerization catalyst with at least one supported metallocene polymerization catalyst in the polymerization of olefins allows for better control of the polymerization, especially gas phase polymerization. Such a system takes advantage of the high activity of the unsupported catalyst and the stability of a supported catalyst. Additionally, the relative timing of the addition of the supported and unsupported catalysts to a reaction system can be used to control a continuous polymerization reaction by stabilizing the reactor bed with the supported catalyst prior to addition of the unsupported catalyst.

4 Claims, No Drawings

MIXED CATALYST SYSTEM

FIELD OF THE INVENTION

The present invention relates to the use of mixed supported and unsupported metallocene type catalysts for the polymerization of olefins.

BACKGROUND OF THE INVENTION

U.S. Pat. No. 5,317,036 teaches the gas-phase polymerization of olefins with metallocene catalysts in liquid form. In such systems resin particle size can be controlled by spraying the liquid catalyst into a zone which is substantially free of resin as disclosed in U.S. Pat. No. 5,693,727, which is incorporated herein by reference. However, it is difficult to control the use of these catalysts because of their high activity.

Supported metallocene catalysts are also known, but these lack high activity and are expensive on a polymer pound basis. Thus, it is desirable to avoid these problems.

SUMMARY OF THE INVENTION

It has been found that the use of at least one unsupported metallocene polymerization catalyst with at least one supported metallocene polymerization catalyst in the polymerization of olefins allows for better control of the polymerization of olefins, especially gas phase polymerization. Such a system takes advantage of the high activity of the unsupported catalyst and the stability of a supported catalyst and yields polymers having lower catalyst residues than polymers produced using catalysts that are totally supported. Additionally, the relative timing of the addition of the supported and unsupported catalysts to a reaction system can be used to control the polymerization reaction.

DETAILED DESCRIPTION OF THE INVENTION

At least two metallocene catalysts, present at weight ratio of 1:99 to 99:1, can be used to provide various molecular weight distribution polymers with varying product properties. The use of catalysts in the manner taught in this invention allows the production of polymers with desirable properties, due to ready control of molecular weight distribution and to in-situ intimate mixing of polymers when making polymers of different types. In addition to the possibility of shaping of the molecular weight distribution by the use of the supported and unsupported catalysts, several other features of the molecular architecture of the polymer that can be controlled with the proper choice of catalysts are:

1. type of stereoregularity
2. degree of stereoregularity
3. type of regioregularity
4. degree of regioregularity
5. comonomer content
6. comonomer distribution statistics
7. unsaturation
8. long chain branching Catalysts can be selected to provide a targeted amount of stereo-irregular material to be made in order to improve processing in end use applications. Copolymers may be created in situ because such a catalyst system can produce two different types of polymers. The process can be run in such a fashion as to allow for in-situ intimate intermingling of the polymers that are made; this intermingling provides good product properties without the need for an expensive down stream compounding step. There may be more than one of each supported and unsupported catalyst, so long as there is at least some supported and unsupported metallocene catalyst in the system.

Catalyst

Any type of metallocene polymerization catalyst may be used in the present process. Accordingly, the catalyst composition may comprise any metallocene catalyst useful in slurry, solution, bulk, or gas phase olefin polymerization. One or more than one metallocene catalyst may be employed. For example, as described in U.S. Pat. No. 4,530,914, at least two metallocene catalysts may be used in a single catalyst composition to achieve a broadened molecular weight distribution polymer product.

Metallocene catalysts are organometallic coordination complexes of one or more Tc-bonded moieties in association with a metal atom from Groups IIIB to VIII or the rare earth metals of the Periodic Table.

Bridged and unbridged mono-, bis-, and tris-cycloalkadienyl/metal compounds are the most common metallocene catalysts, and generally are of the formula:

$$(L)_y R^1{}_z (L")MX_{(x-y-1)} \qquad (I)$$

wherein M is a metal from groups IIIB to VIII of the Periodic Table; L and L" are the same or different and are π-bonded ligands coordinated to M, preferably cycloalkadienyl groups such as cyclopentadienyl, indenyl, or fluorenyl groups optionally substituted with one or more hydrocarbyl groups containing 1 to 20 carbon atoms; $R^1$ is a $C_1$–$C_4$ substituted or unsubstituted alkylene radical, a dialkyl or diaryl germanium or silicon, or an alkyl or aryl phosphine or amine radical bridging L and L"; each X is independently hydrogen, an aryl, alkyl, alkenyl, alkylaryl, or arylalkyl radical having 1–20 carbon atoms, a hydrocarboxy radical having 1–20 carbon atoms, a halogen, $R^2CO_2$—, or $R^2{}_2NCO_2$—, wherein each $R^2$ is a hydrocarbyl group containing 1 to about 20 carbon atoms; y is 0, 1, or 2; x is 1, 2, 3, or 4 depending upon the valence state of M; z is 0 or 1 and is 0 when y is 0; and x-y≧1.

Illustrative but non-limiting examples of metallocene catalysts represented by formula II are dialkyl metallocenes such as bis(cyclopentadienyl)titanium dimethyl, bis(cyclopentadienyl)titanium diphenyl, bis(cyclopentadienyl) zirconium dimethyl, bis(cyclopentadienyl)zirconium diphenyl, bis(cyclopentadienyl)haffium methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl) zirconiun:L dibenzyl, bis(cyclopentadienyl)vanadium dimethyl; mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as, pentamethylcyclopentadienyl titanium trichloride, pentaethylcyclopentadienyl titanium trichloride; the carbene represented by the formula bis(cyclopentadienyl)titanium=$CH_2$ and derivatives of this reagent; substituted bis (cyclopentadienyl)titanium (IV) compounds such as: bis (indenyl)titanium diphenyl or dichloride, bis (methylcyclopentadienyl)titanium diphenyl or dihalide; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride, bis(pentamethylcyclopentadienyl) titanium cdiphenyl or dichloride; silicon, phosphine, amine or carbon bridged cyclopentadiene complexes, such as dimethyl silyl-dicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like; as well as bridged metallocene compounds such as isopropyl (cyclopentadienyl)(fluorenyl)zirconium dichloride, isopropyl(cyclopentadienyl)(octahydrofluorenyl)zirconium dichloride, diisopropylmethylene(cyclopentadienyl) (fluorenyl)zirconium dichloride, diisobutylmethylene (cyclopentadienyl)(fluorenyl) zirconium dichloride, ditertbutylmethylene(cyclopentadienyl)(fluorenyl) zirconium dichloride, cyclohexylidene(cyclopentadienyl) (fluorenyl)zirconium dichloride, diisopropylmethylene(2,5-dimethylcyclopentadienyl)(fluorenyl)zirconium dichloride, isopropyl(cyclopentadienyl)(fluorenyl)hafniium dichloride, diphenylmethylene(cyclopentadienyl)(fluorenyl)hafnium dichloride, diisopropylmethylene(cyclopentadienyl) (fluorenyl)hafium dichloride, diisobutylmethylene (cyclopentadienyl)(fluorenyl)hafnium dichloride, ditertbutylmethylene(cyclopentadienyl)(fluorenyl)hafnium dichloride, cyclohexylidene(cyclopentadienyl)(fluorenyl) hafnium dichloride, diisopropylmethylene(2,5-dimethylcyclopentadienyl) (fluorenyl)-hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl) (fluorenyl)titanium dichloride, diisobutylmethylene (cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5 dimethylcyclopentadienyl fluorenyl)titanium dichloride, racemic-ethylene bis (1-indenyl)zirconium (W) dichloride, racemic-ethylene bis (4,5,6,7-tetrahydro-1-indenyl) zirconium (IV) dichloride, racemic-dimethylsilyl bis (1-indenyl) zirconium (IV) dichloride, racemic-dirmethylsilyl bis (4,5,6,7-tetrahydro-1-indenyl) zirconium (IV) dichloride, racemic-1, 1,2,2-tetramethylsilanylene bis (1-indenyl) zirconium (IV) dichloride, racemic-1,1,2,2-tetramethylsilanylene bis (4,5,6, 7-tetrahydro-1-indenyl) zirconium (IV) dichloride, ethylidene (1-indenyl tetramethylcyclopentadienyl) zirconium (IV) dichloride, racemic-dimethylsilyl bis (2-methyl-4-t-butyl-1-cyclopentadienyl) zirconium (IV) dichloride, racemic-ethylene bis (1-indenyl) hafnimn (IV) dichloride, racemic-ethylene bis (4,5,6,7-tetrahydro-1-indenyl) hafiium (IV) dichloride, racemic-dimethylsilyl bis (1-indenyl) hafaium (IV) dichloride, racemic-dimethylsilyl bis (4,5,6,7-tetrahydro-1-indenyl) hafnium (IV) dichloride, racemic-1,1, 2,2-tetramethylsilanylene bis (1-indenyl) hafnium (IV) dichloride, racemic-1,1,2,2-tetramethylsilanylene bis (4,5,6, 7-tetrahydro-1-indenyl) hafaium (IV), dichloride, ethylidene (1-indenyl-2,3,4,5-tetramethyl-1-cyclopentadienyl) hafnium (IV) dichloride, racemic-ethylene bis (1-indenyl) titanium (IV) dichloride, racemic-ethylene bis (4,5,6,7-tetrahydro-1-indenyl) titanium (IV) dichloride, racemic-dimethylsilyl bis (1-indenyl) titanium (IV) dichloride, racemic-dimethylsilyl bis (4,5,6,7-tetrahydro-1-indenyl) titanium (IV) dichloride, racemic-1,1,2,2-tetramethylsilanylene bis (1-indenyl) titanium (IV) dichloride racemic-1,1,2,2-tetramethylsilanylene bis (4,5,6,7-tetrahydro-1-indenyl) titanium (IV) dichloride, and ethylidene (1-indenyl-2,3,4,5-tetramethyl-1-cyclopentadienyl) titanium IV) dichloride. Particularly preferred metallocene catalysts are diphenylmethylene (cyclopentadienyl)(fluorenyl)zirconium dichloride, racemic-dimethylsilyl bis (2-methyl-1-indenyl) zirconium (IV) dichloride, racemic-dimethylsilyl bis (2-methyl-4-(1-naphthyl-1-indenyl) zirconium (IV) dichloride, and racemic-dimethylsilyl bis (2-methyl-4-phenyl-1-indenyl) zirconium (IV) dichloride.

Another type of metallocene catalyst that can be used in accordance with the invention has one of the following formulas (II or III):

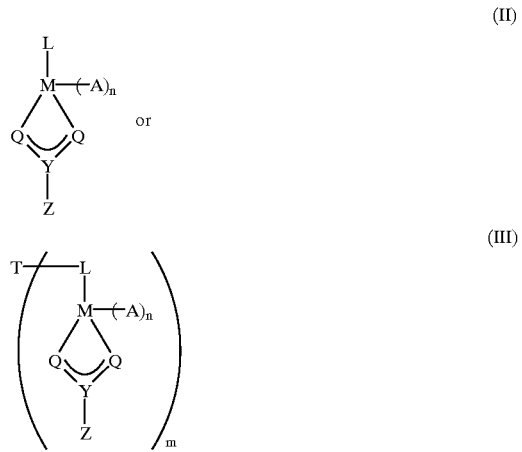

wherein:
M is a metal from groups IIIB to VIII, preferably Zr or Hf;
L is a substituted or unsubstituted, π-bonded ligand coordinated to M, preferably a substituted cycloalkadienyl ligand;
each Q is independently selected from the group consisting of —O—, —$NR^3$—, —$CR^3{}_2$— and —S—, preferably oxygen;
Y is either C or S, preferably carbon;
Z is selected from the group consisting of —$OR^3$, —$NR^3{}_2$, —$CR^3{}_3$, —$SR^3$, —$SiR^3{}_3$, —$PR^3{}_2$, and —H, with the proviso that when Q is —$NR^3$— then Z is selected from the group consisting of —$OR^3$, —$NR^3{}_2$, —$SR^3$, — $SiR^3{}_3$, —$PR^3{}_2$, and —H, preferably Z is selected from the group consisting of —$OR^3$, —$CR^3{}_3$, and —$NR^3{}_2$;
n is 1 or 2;
A is a univalent anionic group when n is 2 or A is a divalent anionic group when n is 1, preferably A is a carbamate, carboxylate or other heteroallyl moiety described by Q, Y and Z combination; and
each $R^3$ is independently a group containing carbon, silicon, nitrogen, oxygen, and/or phosphorus and one or more $R^3$ groups may be attached to the L substituent, preferably $R^3$ is a hydrocarbon group containing from 1 to 20 carbon atoms, most preferably an alkyl, cycloalkyl or an aryl group;
T is a bridging group selected from the group consisting of alkylene or arylene groups containing from 1 to 10 carbon atoms optionally substituted with carbon or heteroatoms, germanium, silicone and alkyl phosphine; and m is 1 to 7, preferably 2 to 6, most preferably 2 or 3.

The supportive substituent formed by Q, Y and Z is a unicharged polydentate ligand exerting electronic effects due to its high polarizability, similar to the cyclopentadienyl group. In the most preferred embodiments of this invention, the disubstituted carbamates,

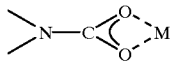

and the carboxylates

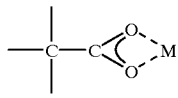

are employed.

Examples of metallocene catalysts according to formulas II and III include indenyl zirconium tris(diethylcarbamate), indenyl zirconium tris(pivalate), indenyl zirconium tris(p-toluate), indenyl zirconium tris(benzoate), (1-methylindenyl) zirconium tris(pivalate), (2-methylindenyl) zirconium tris(diethylcarbamate), (methylcyclopentadienyl) zirconium tris(pivalate), cyclopentadienyl tris(pivalate), and (pentamethylcyclopentadienyl) zirconium tris(benzoate). Preferred examples of these metallocene catalysts are indenyl zirconium tris(diethylcarbamate) and indenyl zirconium tris(pivalate).

Another type of metallocene catalyst that can be used in accordance with the invention is a constrained geometry catalyst of the formula:

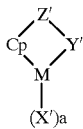

(IV)

wherein:

M is a metal of Group IIIB to VIII of the Periodic Table of the Elements:
Cp is a cyclopentadienyl or substituted cyclopentadienyl group bound in an $\eta^5$ bonded mode to M;
Z" is a moiety comprising boron, or a member of Group IVA of the Periodic Table of the Elements and optionally sulfur or oxygen, the moiety having up to 20 non-hydrogen atoms, and optionally Cp and Z" together form a fused ring system;
X" is an anionic ligand group or a neutral Lewis base ligand group having up to 30 non-hydrogen atoms;
a is 0, 1, 2, 3 or 4 depending on the valance of M; and
Y" is an anionic or non-anionic ligand group bonded to Z" and M comprising is nitrogen, phosphorus, oxygen or sulfur having up to 20 non-hydrogen atoms, and optionally Y" and Z" together form a fused ring system.

Constrained geometry catalysts are well known to those skilled in the art and are disclosed in, for example, U.S. Pat. Nos. 5,026,798 and 5,055,438 and published European Application No. 0 416 815 A2.

Illustrative but non-limiting examples of substituents Z", Cp, Y", X" and M in formula IV are:

| Z" | Cp | Y" | X" | M |
|---|---|---|---|---|
| dimethylsilyl | cyclopentadienyl | t-butylamido | chloride | titanium |
| methylphenylsilyl | fluorenyl | phenylamido | methyl | zirconium |
| diphenylsilyl | indenyl | cyclohexylamido | | hafnium |
| tetramethylethylene | | oxo | | |
| ethylene | tetramethylcyclopentadienyl | | | |
| diphenylmethylene | | | | |

The invention is also useful with another class of single site catalyst precursors, di(imine) metal complexes, as described in PCT Application No. WO 96/23010, which is incorporated herein by reference.

The activating cocatalyst is capable of activating the metallocene catalyst. Preferably, the activating cocatalyst is one of the following: (a) branched or cyclic oligomeric poly(hydrocarbyl-aluminum oxide)s which contain repeating units of the general formula —(Al(R*)O)—, where R* is hydrogen, an alkyl radical containing from 1 to about 12 carbon atoms, or an aryl radical such as a substituted or unsubstituted phenyl or naphthyl group; (b) ionic salts of the general formula $[A=][BR_4-]$, where A+ is a cationic Lewis or Bronsted acid capable of abstracting an alkyl, halogen, or hydrogen from the metallocene catalysts, B is boron, and R is a substituted aromatic hydrocarbon, preferably a perfluorophenyl radical; and (c)boron alkyL; of the general formula $BR_3$, where R is as defined above.

Preferably, the activating cocatalyst is an aluminoxane such as methylaluminoxane (MAO) or modified methylaluminoxane (MMAO), or a boron alkyl. Aluminoxanes are preferred and their method of preparation is well known in the art. Aluminoxanes may be in the form of oligomeric linear alkyl aluminoxanes represented by the formula:

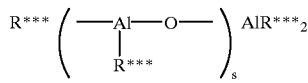

or oligomeric cyclic alkyl aluminoxanes of the formula:

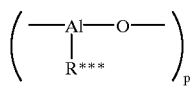

wherein s is 1–40, preferably 10–20; p is 3–40, preferably 3–20; and R* is an alkyl group containing 1 to 12 carbon atoms, preferably methyl or an aryl radical such as a substituted or unsubstituted phenyl or naphthyl radical. In the case of MAO, R* is methyl, whereas in MMAO, R* is a mixture of methyl and C2 to C12 alkyl groups wherein methyl comprises about 20 to 80 percent by weight of the R* group.

The amount of activating cocatalyst and metallocene catalyst usefully employed in preparation of the catalyst composition, whether the catalyst composition is formed in situ as it is being introduced into the reaction zone or formed prior to introduction into the reaction zone, can vary over a wide range. When the cocatalyst is a branched or cyclic oligomeric poly(hydrocarbylaluminum oxide), the mole ratio of aluminum atoms contained in the poly (hydrocarbylaluminum oxide) to metal atoms contained in the metallocene catalyst is generally in the range of from about 2:1 to about 100,000:1, preferably in the range of from about 10:1 to about 10,000:1, and most preferably in the range of from about 50:1 to about 2,000:1. When the cocatalyst is an ionic salt of the formula $[A^+][BR^*_4{}^-]$ or a boron alkyl of the formula $BR^*_3$, the mole ratio of boron atoms contained in the ionic salt or the boron alkyl to metal atoms contained in the metallocene catalyst is generally in the range of from about 0.5:1 to about 10:1, preferably in the range of from about 1:1 to about 5:1.

The catalyst can be composed of one or more of metal compounds in combination with one or more co-catalysts. Alternatively, all or a portion of the co-catalyst can be fed separately from the metal compound(s) to the reactor. Promoters associated with any particularly polymerization are usually added to the reactor separately from the co-catalyst and/or metal compound(s).

Unsupported Catalyst

The unsupported metallocene(s) for use herein are generally in a liquid form. As used herein, "liquid catalyst" or "liquid form" includes, neat, solution, emulsion, colloids, suspension and dispersions of the transition metal or rare earth metal component(s) of the catalyst.

If the metal compound and/or the co-catalyst occurs naturally in liquid form, it can be introduced "neat" into the reactor. More likely, the liquid catalyst is introduced into the reactor as a solution (single phase, or "true solution" using a solvent to dissolve the metal compound and/or co-catalyst), an emulsion (partially dissolving the catalyst components in a solvent), suspension, dispersion, or slurry (each having at least two phases). Preferably, the unsupported catalyst employed is a solution or an emulsion, most preferably a solution.

The solvents which can be utilized to form liquid catalysts are inert solvents, preferably non-functional hydrocarbon solvents, and may include aliphatic hydrocarbons such as butane, isobutane, ethane, propane, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, tetrahydrofuran and the like; petroleum fractions such as gasoline, kerosene, light oils, and the like; and mineral oil. Likewise, halogenated hydrocarbons such as methylene chloride, chlorobenzene, ortho-chlorotoluene and the like may also be utilized. By "inert" is meant that the material being referred to is non-deactivating in the polymerization reaction zone under the conditions of gas phase polymerization and is non-deactivating with the catalyst in or out of the reaction zone. By "non-functional", it is meant that the solvents do not contain groups such as strong polar groups which can deactivate the active catalyst metal sites.

The concentration of the catalyst and/or co-catalyst that is in solution that is provided to the reactor may be as high as the saturation point of the particular solvent being used. Preferably, the concentration is in the range of from about 0.01 to about 10,000 millimoles/liter. Of course, if the catalyst and/or co-catalyst is being used in its neat form, i.e., in its liquid state with no solvent, it will be: comprised of essentially pure catalyst and/or co-catalyst, respectively. Liquid flowrates of catalyst, cocatalyst, and activators range between 5 and 250 kg/hr for commercial scale gas-phase reactors.

Supporting the Catalyst

The supported metallocene catalyst(s) may be of the type that is naturally supported or artificially supported. Naturally supported catalysts are those which employ an aluminoxane as a morphology template. Neat MAO is a solid at room temperature and when it is prepared with controlled morphology, it can be used as a natural support for a metallocene catalyst. Two methods by which the morphology of MAO can be controlled are by removing the solvent by a technique such as spray drying, as described by Union Carbide in EP 668295 or precipitated from solution as described U.S. Pat. Nos. 4,952,540 and 4,923,833.

As to the artificially supported catalysts, said support may be any of those known in the art. Examples of such support systems are inorganic oxides (silica, alumina, mixtures thereof, mixtures thereof with Ti, Mg, Zr, etc.), finely divided polyolefins, and porous polymer systems, such as polystyrene. High surface area silica may be used. In most cases, said materials should be thoroughly dried before contact with the catalyst. Said contact is preferably done in the presence of a solvent (e.g., isopentane, heptane, decane, toluene, benzene, and xylene) and at room temperature so as not to deactivate the catalyst. The solvent is removed at reduced pressure.

Supported metallocenes are disclosed in PCT WO 94/28034 published Dec. 8, 1994 and in U.S. Pat. No. 5,332,706, which are incorporated herein by reference.

Additional Catalysts

In addition to the supported and unsupported metallocenes, other catalyst may be added to the system to provide for different product properties. Examples of suitable catalysts include:

A. Ziegler-Natta catalysts, including titanium based catalysts such as those described in U.S. Pat. Nos. 4,376,062 and 4,379,758. Ziegler-Natta catalysts are typically are magnesium/titanium/electron donor complexes used in conjunction with an organoaluminum cocatalyst.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as described in U.S. Pat. No. 5,317,036.

D. Cationic forms of metal halides, such as aluminum trihalides.

E. Cobalt catalysts and mixtures thereof such as those described in U.S. Pat. Nos. 4,472,559 and 4,182,814.

F. Nickel catalysts and mixtures thereof such as those described in U.S. Pat. Nos. 4,155,880 and 4,102,817.

G. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. Neodymium compounds, particularly neodymium neodecanoate, octanoate, and versatate, are the most preferred rare earth metal catalysts.

Polymers

Illustrative of the polymers which can be produced herein are the following: ethylene homopolymers and ethylene copolymers employing one or more $C_3$–$C_{12}$ alpha olefins; propylene homopolymers and propylene copolymers employing one or more alpha olefins selected from the group $C_2$, $C_4$–$C_{12}$; propylene copolymers employing one or more α–ω diolefins selected from the group $C_5$–$C_{12}$ (e.g., ethylene norbordiene); 1-butene homopolymers and 1-butene copolymers employing one or more alpha olefins selected from the group $C_2$, $C_3$, $C_5$–$C_{12}$; 1-butene copolymers employing one or more α–ω diolefins selected from the group $C_5$–$C_{12}$; 4-methyl-1-pentene homopolymers and 4-methyl-1-pentene copolymers employing one or more alpha olefins selected from the group $C_2$–$C_{12}$; 4-methyl-1-pentene copolymers employing one or more α–ω diolefins selected from the group $C_5$-$C_{12}$; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like.

Polymerization

The present invention is not limited to any specific type of polymerization and may include gas phase, slurry, solution, bulk, and similar types of polymerization. Gas phase polymerization is preferable, especially one carried out in a stirred or fluidized bed reactor. The invention can be carried out in a single reactor or multiple reactors (two or more reactors in series), with catalysts being added to one or more of these reactors. However, this invention is thought to be most useful in the manufacture of two polymers in a single reactor. In addition to well known conventional gas phase polymerization processes, "condensed mode", including the so-called "induced condensed mode", and "liquid monomer" operation of a gas phase polymerization can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream.

Condensed mode polymerization is disclosed in U.S. Pat. Nos. 4,543,399; 4,588,790; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers, including the monomer to be polymerized. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduce to "induce" condensing mode operation. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof).

Condensable fluids may also include polymerizable condensable monomers such as olefins, alpha-olefins, diolefins, diolefins containing at least one alpha olefin, and mixtures thereof In condensing mode, it desirable that the liquid entering the fluidized bed be dispersed and vaporized quickly.

Liquid monomer polymerization mode is disclosed, in U.S. Pat. No. 5,453,471, U.S. Ser. No. 510,375, now U.S. Pat. No. 5,834,571, PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, liquid monomer process are conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter.

In a preferred embodiment of the present invention, the liquid catalyst in a carrier gas (e.g., nitrogen, argon, alkane, or mixtures thereof) is surrounded by at least one gas which serves to move or deflect resin particles of the bed out of the path of the liquid catalyst as it enters the fluidization zone and away from the area of catalyst entry, thereby providing a particle lean zone. The first or particle-deflecting gas can be selected from the group consisting of recycle gas, monomer gas, chain transfer gas (e.g., hydrogen), inert gas or mixtures thereo. Preferably the particle-deflecting gas is all or a portion of recycle gas and the tip-cleaning gas is all or a portion of a monomer (e.g., ethylene or propylene) employed in the process.

Catalyst Feeding

The supported and unsupported catalysts may be fed as a mixture to the reactor or separately. The catalyst may be fed in a preactivated or prepolymerized form. One catalyst may be prepolymerized and/or preactivated and the other not, as desired.

In a preferable embodiment, especially in a continuous (non-batch) process, initially the supported catalyst is fed to the reactor to form a stable polymer bed in the reactor. Once the reactor bed has been stabilized, typically in about 5 to about 300 minutes, depending upon the reactor size, then the higher activity unsupported catalyst may be fed. This type of feeding, especially to a continuous gas phase reactor system, allows for obtaining the advantage of the activity of tile unsupported catalyst, but achieving the operating stability of the supported catalyst system.

The unsupported catalyst is preferably fed to the reactor with the aid of a gas, either combined prior to injection or preferably with an effervescent or perpendicular spray nozzle. Gases for use may be any relatively inert to the catalyst so that there is not blockage in the catalyst nozzle. Exemplary gases include $N_2$, Ar, He, $CH_4$, $C_2H_6$, $C_3H_8$, $CO_2$, $H_2$, cycle gas. The gas may be under supercritical fluid conditions. Reactive gases (e.g., olefins) may be used if the catalyst is activated in the reactor, e.g., the cocatalyst is fed separately. The gas flow rates in the nozzle should be between about 5 and 200 kg/hr., depending upon the reactor size and particle size control as discussed above.

Other Material

Non-catalytic liquids may also be delivered to the reactor, e.g., solvents, anti-fouling agents, scavengers, monomers, antistatic agent,w;, secondary alkyls, stabilizers or antioxidants. Some specific examples include methanol, veratrole, propylene oxide, glyme, 1,2 dimethoxypropane, water, ATMER-163 antistat agent (ICI Chemicals), hydrogen, metal alkyls of the general formula $M^3R^5g$, where $M^3$ is a Group IA, IIA or IIIA metal, $R^5$ is an alkyl or aryl, and g is 1, 2, or 3; zinc alkyls, $CHCl_3$, $CFCl_3$, $CH_3CCl_3$, $CF_2ClCCl_3$, ethyltrichloroacetate, aluminum alkyls, most preferably triisobutylaluminum. The gas in such situations may be the cycle gas in a gas phase reactor that is operating in condensing mode or may be another inert gas, as is used with the delivery of the catalyst. The addition of this liquid can be any where to the reaction system, e.g., to the bed, beneath the bed, above the bed or to the cycle line. The use of these additives is well within the skill of those skilled in the art. These additives may be added to the reaction zone separately or independently from the liquid catalyst if they are solids, or as part of the catalyst provided they do not interfere with the desired atomization. To be part of the catalyst solution, the additives should be liquids or capable of being dissolved in the catalyst solution.

Specific Uses

Examples of the use of this invention would be as follows: Catalyst "A" (unsupported) and Catalyst "A" (supported) wherry both catalysts are the same. This combination will give the narrow molecular weight distribution (MWD) of Mw/Mn (weight average molecular weight to number average molecular weight) of about 2 to about 4 and the molecular homogeneity expected from metallocene catalysts, but with better control of the polymerization process.

Catalyst "B" (unsupported) and catalyst "C" (supported), where high melt flow polymer is made by catalyst "C" and low melt flow polymer is made by catalyst "B". The use of unsupported catalyst to polymerize the low melt flow polymer leads to good dispersion of the low melt flow polymer in the nascent powder. This allows ready manufacture of broad MWD (Mw/Mn of about 5 to about 100) polymer without the use of a high shear downstream compounding step to mix polymers having widely different melt flows.

Catalyst "D" (unsupported) and catalyst "E" (supported), where the polymer made by catalyst "E" contains some amount of stereo-irregular material. The intermingling of the molecules made by catalyst "D" and by catalyst "E" reduces the stickiness (as defined in U.S. Pat. No. 4,994,534, which is incorporated herein by reference) of the resulting powder.

Catalyst "F" (unsupported) and catalyst "G" (supported), where the copolymer made by catalyst "G" has less random distribution of comonomer units than does the copolymer made by catalyst "F". This provides, in the case of low comonomer content random copolymers, enhanced physical properties coupled with good heat sealing performance.

Catalyst "H" (unsupported) and catalyst "I" (supported), in a series of reactors in which a homopolymer phase is made in a first reactor and an ethylene-propylene rubber in the second reactor wherein the rubber has two different ethylene-propylene polymers with different xylene solubles. The copolymer made by catalyst "H" has less random distribution of comonomer units than does the copolymer made by catalyst "I". This provides, in the case of "impact" copolymers, superior impact stiffness balance, similar to those obtained by the more expensive process of using blends of EPR and PE as the rubber phase of an impact copolymer. The intimate mixing of catalyst sites that takes place in the first reactor provides advantages for the in-situ dispersion of rubber that takes place in the "rubber" reactor.

EXAMPLES

Mixed catalyst systems of a supported catalyst and a solution catalyst were fed to a slurry phase autoclave and used to polymerize ethylene with a minor amount of hexene. The examples are set forth in Table 1 below. The fourth column is the molar ratio between the two catalysts. The fifth column is a molar ratio. MAO is methyl alumoxane. The activity is measured in gm PE/per millimole Zr per hour per hundred psi of ethylene. The Mw and PDI (polydispersity index) were measured by Size Exclusion Chromatography at 140° C., Method A, using a cross-linked polystyrene column set provides for Mw separation covering a daltons range of 200 to 10,000,000 with 1,2,4-trichlorobenzene as carrier solvent.

The liquid catalyst was BuCpZ (bis(n-butyl cyclopentdienyl) zirconium dichloride) or SIZR-2 (dimethyl silyl bis(2-methyl indenyl) zirconium dichloride). These catalysts were used in a hydrocarbon solution. SIZR-2/BuCpZ was a physical mixture of the two catalysts. The supported catalysts were S-1 (BuCpZ supported on a silica carrier) and S-2 (SIZR-2 supported on a silica carrier). The MAO was on the support with the catalyst (about 0.6 mmol/gm silica). The silica was Davison 955–600.

The results show some of the benefits of the present invention. As compared to the unsupported BuCpZ, higher molecular weight polymer could be made with the present invention (runs 3 and 4), but at a higher activity than supported BuCpZ. These runs show how to control catalyst activity as well. The second four runs show that the present invention (runs 7 and 8) may be used to control PDI and Mw of polymers.

TABLE 1

| Run No. | Unsupported Catalyst | Supported Catalyst | Soln/Supt | Cocat/Zr | H$_2$ (ml) | C$_6$ (ml) | Activity | Mw | PDI |
|---|---|---|---|---|---|---|---|---|---|
| 1 |  | BuCpZ |  |  | 0 | 20 | 44302 | 108519 | 2.1 |
| 2 | BuCpZ |  |  | 750 | 0 | 20 | 71358 | 26956 | 2.7 |
| 3 | BuCpZ | BuCpZ | 0.5 | 750 | 0 | 20 | 59327 | 39780 | 2.5 |
| 4 | BuCpZ | BuCpZ | 1 | 750 | 0 | 20 | 66867 | 28111 | 2.1 |
| 5 |  | SIZR-2/BuCpZ |  |  | 120 | 20 | 46139 | 66061 | 2.7 |
| 6 | SIZR-2/BuCpZ |  |  | 1500 | 120 | 20 | 56277 | 86905 | 8.5 |
| 7 | SIZR-2 | BuCpZ | 1 | 400 | 120 | 20 | 56326 | 53750 | 3.7 |
| 8 | BuCpZ | SIZR-2 | 1 | 400 | 120 | 20 | 53271 | 59162 | 6.4 |

We claim:

1. A composition comprising an unsupported metallocene catalyst and a supported metallocene catalyst wherein both the unsupported and supported metallocene catalyst satisfy at least one of the following structural formulae (II) or (III):

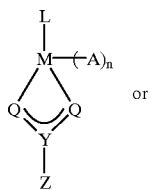

(II)

or

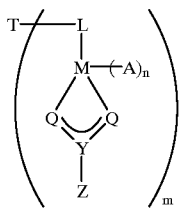

(III)

wherein:

M is a Hf or Zr metal;

L is a substituted or unsubstituted, π-bonded ligand coordinated to M;

each Q is independently selected from the group consisting of —O—, —NR$^3$—, —CR$^3{}_2$—and —S—;

Y is C;

Z is selected from the group consisting of —OR$^3$, —NR$^3{}_2$, —CR$^3{}_3$, —SR$^3$, —SiR$^3{}_3$, —PR$^3{}_2$, and —H, with the proviso that when Q is —NR$^3$— then Z is selected from the group consisting of —OR$^3$, —NR$^3{}_2$, —SR$^3$, —SiR$^3{}_3$, —PR$^3{}_2$, and —H;

n is 1 or 2;

A is a univalent anionic group when n is 2 or A is a divalent anionic group when n is 1; and each R$^3$ is independently a group containing carbon, silicon, nitrogen, oxygen, and/or phosphorus and one or more R$^3$ groups may be attached to the L substituent;

T is a bridging group selected from the group consisting of alkylene groups containing from 1 to 10 carbon atoms optionally substituted with carbon or heteroatoms, arylene groups containing from 1 to 10 carbon atoms optionally substituted with carbon or heteroatoms, germanium, silicone and alkyl phosphine; and m is 1 to 7.

2. The composition according to claim 1, wherein L is a substituted cycloalkadienyl ligand, Q is O, Z is selected from the group consisting of —OR$^3$, —CR$^3{}_3$ and —NR$^3{}_2$, A is a carbamate, carboxylate or other heteroallyl moiety defined by the combination of Q, Y and Z, R$^3$ is selected from the group consisting of an alkyl, cycloalkyl and aryl group, and m is 2 or 3.

3. A process for polymerizing at least one olefin comprising polymerizing said at least one olefin in the presence of the catalyst composition of claim 1.

4. A process according to claim 3, where the at least one olefin is propylene.

* * * * *